April 7, 1953 G. H. CANNELLA 2,634,023
SYSTEM AND APPARATUS FOR DISPENSING FLUIDS
Filed June 20, 1950 4 Sheets-Sheet 1
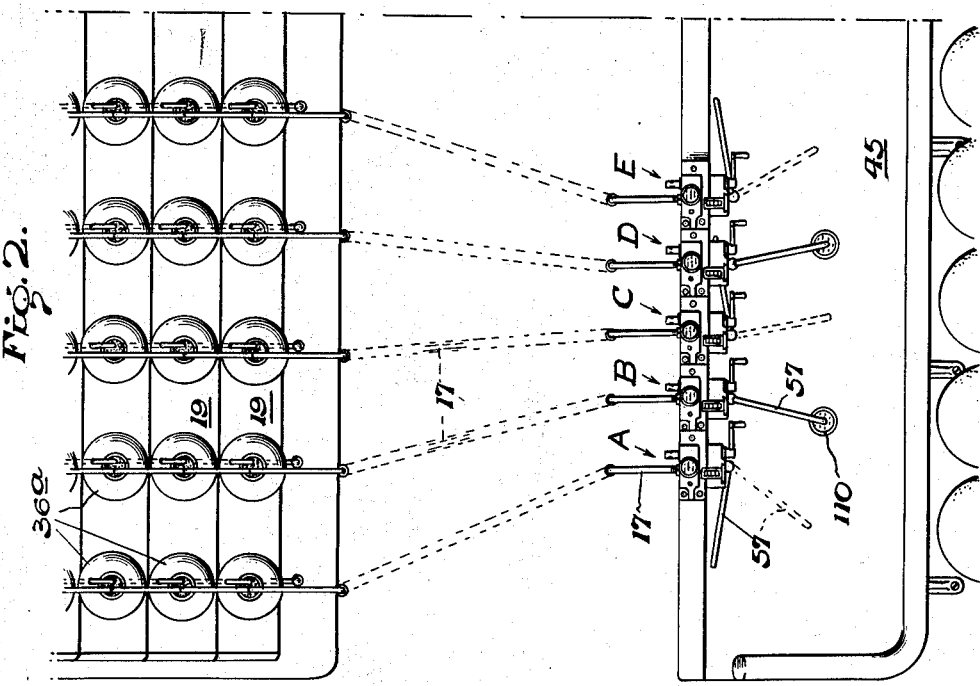
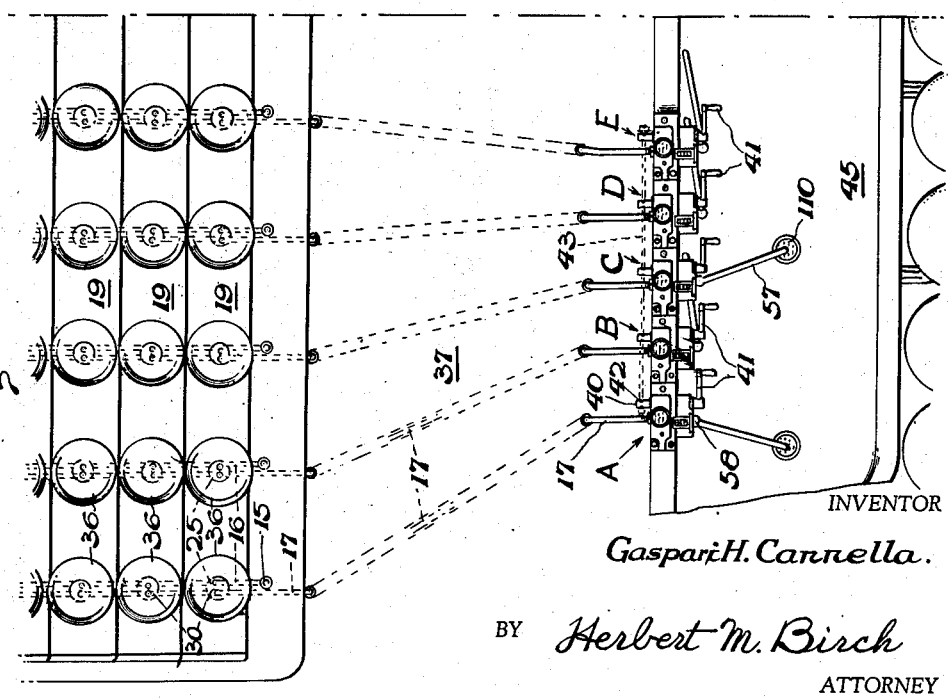
INVENTOR
Gaspari H. Cannella.
BY Herbert M. Birch
ATTORNEY April 7, 1953  G. H. CANNELLA  2,634,023
SYSTEM AND APPARATUS FOR DISPENSING FLUIDS
Filed June 20, 1950  4 Sheets-Sheet 2
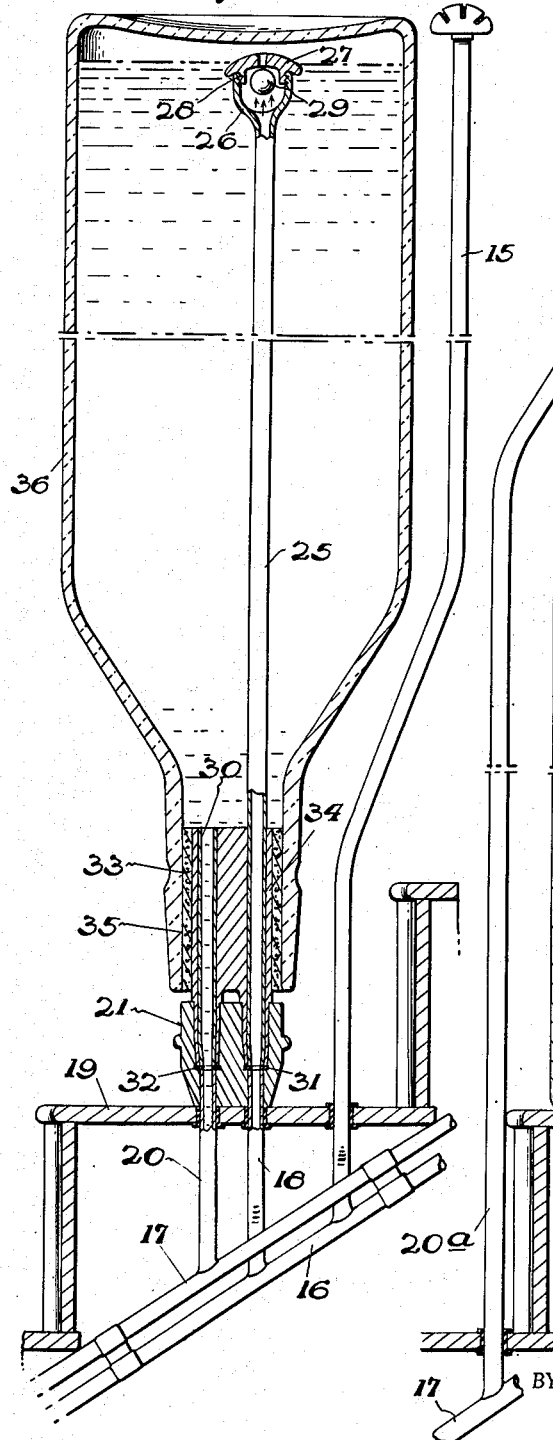
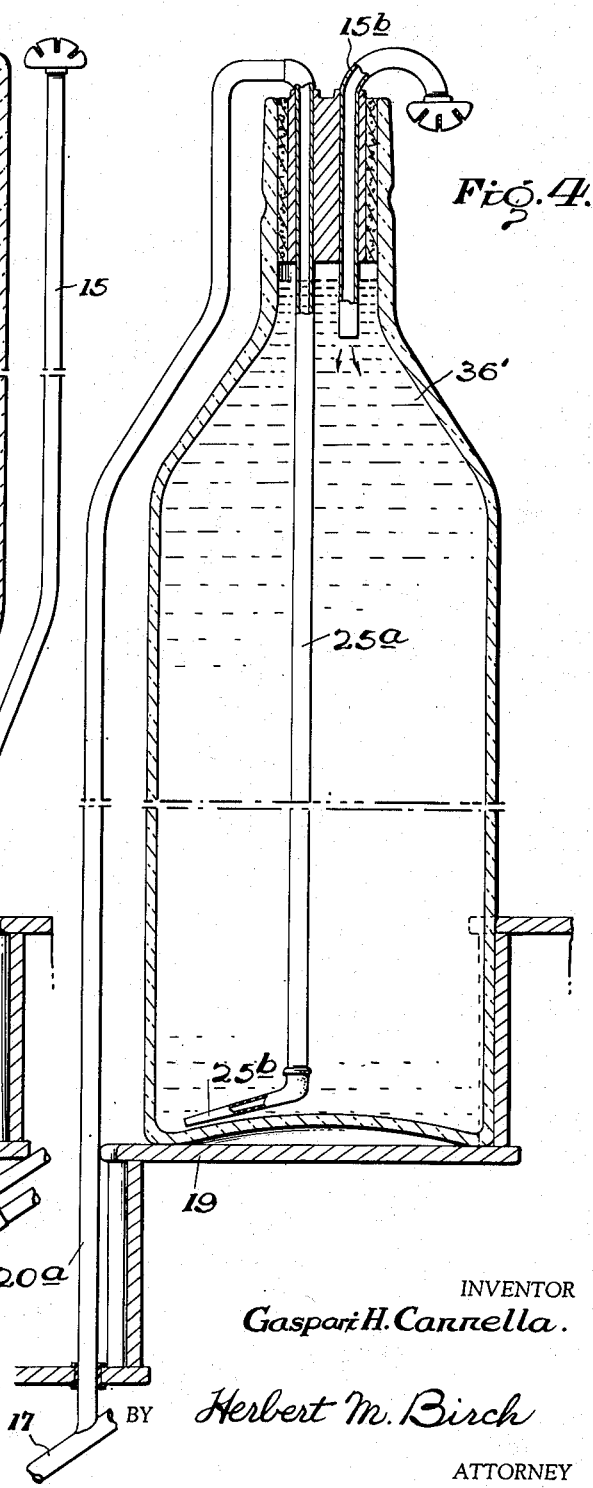
INVENTOR
Gaspari H. Cannella.
BY Herbert M. Birch
ATTORNEY April 7, 1953  G. H. CANNELLA  2,634,023
SYSTEM AND APPARATUS FOR DISPENSING FLUIDS
Filed June 20, 1950  4 Sheets-Sheet 3
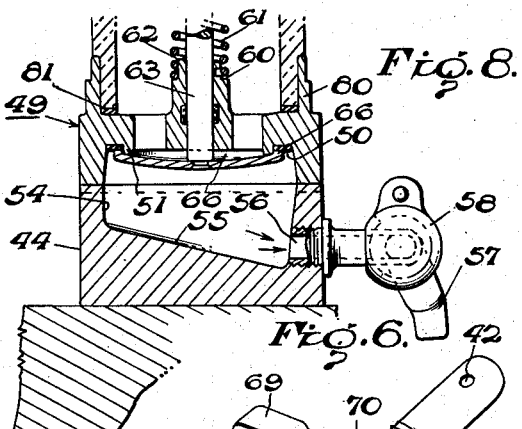
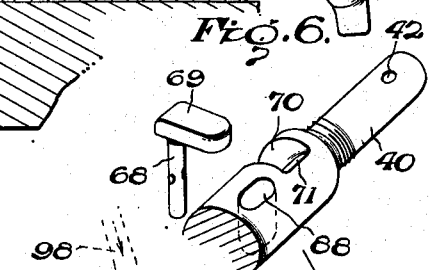
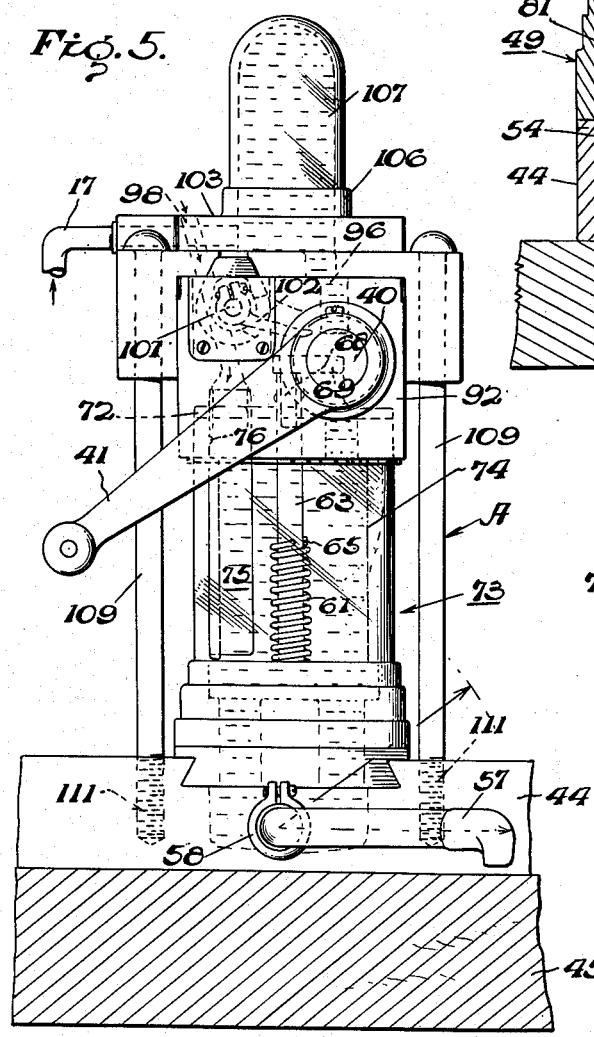
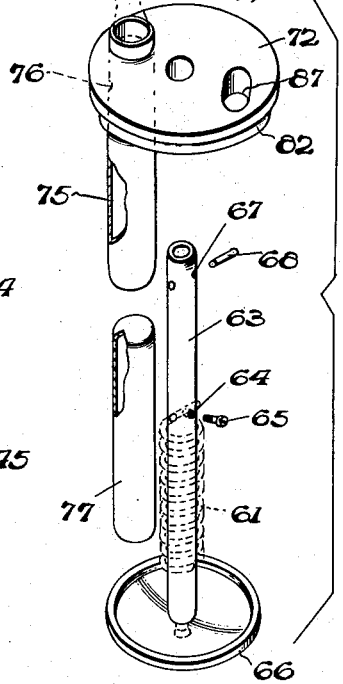
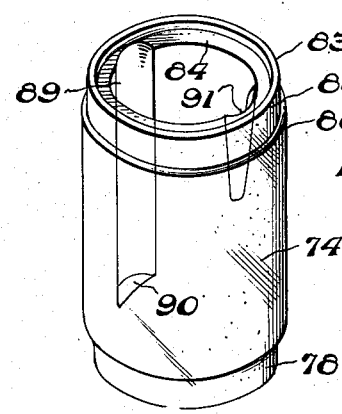
INVENTOR
Gaspari H. Cannella.
BY Herbert M. Birch
ATTORNEY April 7, 1953  G. H. CANNELLA  2,634,023
SYSTEM AND APPARATUS FOR DISPENSING FLUIDS
Filed June 20, 1950  4 Sheets-Sheet 4
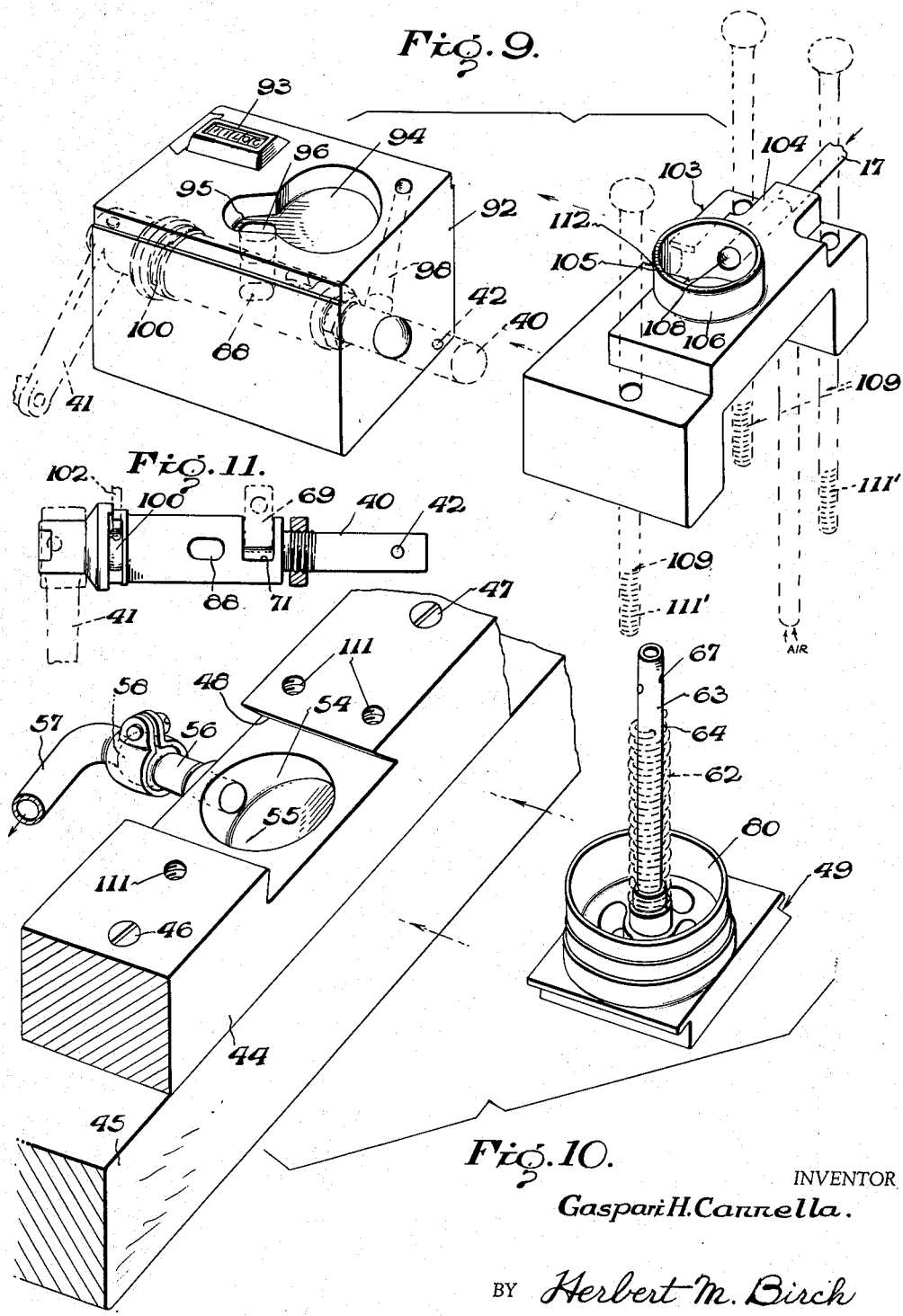
INVENTOR
Gaspari H. Cannella.
BY Herbert M. Birch
ATTORNEY

Patented Apr. 7, 1953

2,634,023

UNITED STATES PATENT OFFICE 2,634,023

SYSTEM AND APPARATUS FOR DISPENSING FLUIDS

Gaspari H. Cannella, Brooklyn, N. Y.

Application June 20, 1950, Serial No. 169,243

4 Claims. (Cl. 222—36)

1

The present invention relates to a system and apparatus for dispensing fluids and more particularly to dispensing fluids in a plurality of measured amounts and counting each measured amount dispensed.

One particular use for the present invention is in the dispensing of wines and liquors over the bar or counter so as to make it substantially impossible to dispense any liquids except in measured uniform amounts. Also, each such measured uniform amount dispensed is automatically counted so that any unauthorized disposition of a measured quantity by the bartender or the like may be detected.

Heretofore, in night clubs, saloons and the like, often-times many thousands of dollars are lost by the proprietors each month by over-sized drinks from the bartender and sometimes unauthorized "drinks on the house." Accordingly, the principal object of this invention is to eliminate such financial losses to proprietors by producing a new and useful device adapted to measure out only uniform amounts of fluid and keep a count of each amount dispensed on the basis of a standard drink to a customer.

Another object is to provide a system for dispensing liquid selectively from a plurality of banks of containers normally displayed over and to the rear of the bar or dispensing counter in ornamentally displayed rows.

Another object is to provide a plurality of novel dispensing units adapted to be mounted side-by-side along the rear edge of the bar with means to lock the units to prevent unauthorized use when desired.

A further object is to provide a dispensing unit adaptable for self service if desired.

Still another object is to provide a predetermined quantity dispensing unit which is rugged, durable and economical to manufacture and readily installed in any suitable location.

The above and other objects and advantages of the invention will appear more fully hereinafter from a consideration of the detailed description which follows, taken together with the accompanying drawing wherein the invention is illustrated. It is to be understood, however, that the drawings are for the purpose of illustration only and are not intended to define the limits of the invention, reference being had for that purpose to the appended claims.

In the drawings wherein like reference characters refer to like parts throughout the several views:

Figure 1 is a semi-diagrammatic illustration of the present invention system showing a plural-

2 ity of liquor bottles mounted to the rear of the bar or counter in inverted position.

Figure 2 is a similar view to Figure 1 with the exception of the bottles, which are shown in a normal upright position.

Figure 3 is an enlarged view in cross section of an inverted bottle such as employed in Figure 1.

Figure 4 is an enlarged view in cross section of an upright bottle, same as employed in Figure 2.

Figure 5 is a cross section of the bar or counter showing one of the novel dispensing units thereon in front elevation.

Figure 6 is a view of the intake and dispensing valves, air vent structures and valve and counter operating cam shaft in pulled apart perspective.

Figure 7 is a perspective view of the measuring glass or trap for collecting a predetermined amount of liquid from the intake valve prior to discharge into a glass of equal quantity volume.

Figure 8 is a partial cross section view of the lower portion of the dispenser unit, showing the outlet valve closed above a final discharge chamber connected to a universally mounted outlet tap or spout.

Figure 9 is a perspective view of the two parts which form the head of the unit and support the drink counter wheel operating crank and control shaft for simultaneously actuating the counter wheel and the inlet valve.

Figure 10 is a perspective view of the base mounted on a bar and with a part separated therefrom to illustrate the facility with which the parts may be cleaned when desired.

Figure 11 is a side elevation view of the counter wheel cam surface and the outlet valve cam of the crank actuated dispenser shaft.

Referring in detail to the drawings, particular reference is first made to the system arrangements in Figures 1 and 3. In Figures 1 and 3 the liquid is dispensed by gravity from tiers of spaced apart rows of inverted bottles 10, 11, 12, 13 and 14 with an air inlet tube 15 connecting with a main air manifold 16 connected in parallel with a main liquid manifold 17. From the air manifold 16 is a branch inlet air line 18, which projects upward through a step or shelf 19 under which are concealably mounted the air manifold 16 and the liquid manifold 17.

A branch outlet liquid line 20 extends upwardly through the step or shelf 19 in substantially parallel relation to the air inlet line 18 into a connecting socket 21. The socket 21 is counter-bored from the top part through the socket to the ends of lines 18 and 20, respectively.

Each counter-bored section is preferably lined. One section serves as a supporting socket for an elongated air conduit 25 with an internally threaded bell-shaped end 26 covered by a centrally apertured cap 27. The cap 27 is formed with an exteriorly threaded flange 28. Inside the bell-chamber or end 26 is a ball weight 29 adapted to seat over and regulate the air aperture in the cap 27. The other counter-bored section serves as a supporting socket for a relatively short liquid outlet tube 30. To provide for a fluid tight seal at the end of each tube in the socket 21 are gaskets 31 and 32, respectively. For example, when mounting a full bottle of liquid it is first held in its upright position so that weight 29 is over the opening in cap 27. The stopper 33 and socket 21 are in the neck of the bottle and when the bottle is inverted and placed over tubes 18 and 20 the weight leaves the cap aperture and exposes the aperture to the air feed into the bottle above the level. This keeps the liquid out of the air line.

As shown in Figure 3, there is a bottle stopper 33 formed with two elongated longitudinally extending openings formed with metal linings 34 and 35 mounted over the conduits 25 and 30. Thus air passes through the bottle stopper into the bottle 36 mounted neck down over the stopper and liquid being dispensed passes through the conduit 30 into the liquid manifold 17.

The liquid manifold 17 leads downwardly and under the floor 37 and thence upwardly into the respective dispensing unit, generally referenced A. For example, see Figure 9 which shows an inlet to the unit A. The remaining units B, C, D and E each connect with a similarly arranged row of tiered bottles, each of which may contain a different brand of liquid, for example.

As each unit is identical in structure a description of only one is necessary. It is to be noted, however, that the actuator shaft 40 of each unit A, B, C, D and E with the actuating crank 41 is formed with an alignable opening 42 for receiving an elongated locking bar 43. This bar is used to gang lock the several units A to E when the place of business is closed.

Referring to Figure 5 one unit A is shown assembled and comprises a base 44 of light metal, such as aluminum, or any available metals. The base 44 is rectangular and may be secured to a bar 45 by screws 46 and 47 as shown in Figure 10. Centrally located between the ends of the base is a cut out portion 48 of a dovetail joint, which cooperates with a dovetail plate 49 formed on its underside with an annular depending skirt or flange 50, see Figure 8, and an annular valve seat 51. The recess 50 registers over the rim of an annular trough 54 having a slanting bottom surface 55 leading to a discharge coupling 56 threaded into the base at this point. This coupling makes a universal connection with a discharge spout 57 by means of a ball joint connection 58, see Fig. 10.

The valve seat plate 49 is formed with arcuate outlet openings 58 around a central upstanding bushing 59 from the side of the plate opposite the trough 54. The bushing 59 is formed with a reduced top section 61, see Fig. 8, to provide an annular shoulder 60, which supports the lower convolution of a coiled spring 62. The spring 62 is secured to the reduced section 61 by a transverse pin driven through the section 61. Extending upward from the underside of the valve seat plate 49 is an elongated tubular valve stem 63, see Figures 6 and 10. At a medial point on the valve stem is a transverse opening 64 for securing the upper end of the coil spring 62 therein by a pin 65. Thus as the spring 62 is kept under compression the valve stem 63 is normally biased upward, to thereby maintain the valve 66 seated as shown in Figure 8 until released by the operator.

The upper free end of the valve stem 63 is hollow and formed with a transverse opening 67 to receive a pin 68, shown in Figure 6. Into the open free end of the stem 63 is mounted the stem or shank 68 of a headed cam follower 69. The stem 68 likewise has a transverse opening 70a, adapted to be aligned with opening 67, to thereby permit the pin 68 to be inserted through the openings and secure the cam follower to the valve stem. The cam follower is positioned for the head thereof to engage in a slot 70 formed in an enlarged portion 71 at the bottom of the slot when the shaft 40 is turned by handle crank 41.

In assembling the device, the cam follower 69 is not installed, until after the top plate 72 of the predetermined amount chamber 73, the glass body 74 thereof and the novel automatic vent control tube 75 with vent opening 76 and vent closing and opening piston or float 77 are assembled over and around the valve stem 63. As each of the parts 72, 74, 75 and 77 are critical to the operation of the device, they will be separately described in the order of their assembly. For example, in Fig. 7, the glass body 74, may be internally bored to hold any predetermined amount of fluid to be dispensed. Thus such glasses may be made to be interchangeable and by merely varying the diameter of the internal bore a small fraction of an inch, they may hold varying amounts such as ¾, 1⅛, or 2 ounces of fluid as desired. The exterior circumference of the glass 74 is kept at a standard diameter, so that no change is necessary in the size of apparatus. Around the bottom of the glass exterior is formed a reduced section 78 with a shoulder 79. The section 78 fits in an annular upstanding ring 80 formed from the valve seat plate 49, see Fig. 8, and the shoulder 79 rests on the rim of ring 80. Any suitable fluid sealing packing may be applied between these parts as shown at 81. When the glass body 74 is thus seated in the valve seat plate 49, the top plate 72 is fitted over the upper end of the valve stem 63. Due to an undercut reduced portion 82, see Fig. 6, the plate 72 fits within the top counterbored rim 83 of glass 74 and seats on a land 84. Also, for a purpose hereinafter to be explained the exterior of the glass 74 is reduced at 85 to form a shoulder 86.

The plate 72 is formed with a liquid inlet opening 87 of elliptical shape for registry with an inlet valve aperture 88 formed in the enlarged end of shaft 40 adjacent the cam slot 70, see Figures 6 and 11. Also, plate 72 has the air inlet tube 75 mounted therein with the piston or float 77 for opening and closing the vent 76. Accordingly the wall of the glass 74 is formed with an elongated arcuate longitudinally extending recess 89, see Fig. 7, to permit the best possible fit between the parts. The bottom 90 of the recess 89 extends slightly below the open end of air inlet tube 75 and serves as a stop for the piston or float 77 when suction caused by dispensing liquid from the body 74 causes the air vent 76 to be exposed. The float 77 is raised by the liquid in chamber 74 when it is full and the discharge valve 66 is closed. Thus when the system is charged with fluid the vent is normally closed and only opens when the valve 66 is opened to discharge the liquor from the glass 74.

Opposite to the recess 89 is a relatively shorter and shallower recess 91 for registry at its upper end with the plate liquid inlet opening 87. When the plate 72 and its parts are placed over the valve stem 63 and in seated position then a fluid distributor and counter clock supporting block 92, see Figures 5 and 9, with a bottom annular opening is placed over the reduced part 85 of glass 74.

This block 92 is of light weight metal, such as aluminum and has a transverse opening therethrough in which is rotatably mounted the actuator shaft 40, see Figures 9 and 11. The shaft 40 is shown in detail in Figure 11 and extends between the vendor counter 93 mounted in the top of block 92, a fluid distributor recess or pocket 94 formed in the top of the block and the plate 72 over the top of glass 74. The pocket 94 is annular with a connecting U-shaped pocket 95 having a fluid inlet opening 96 formed in its bottom surface.

An air conduit 98 is formed in the block 94 from tube 75. The lower end of conduit 98 is enlarged to fit over the top end of air tube 75 as it projects from top plate 72, see Figures 5 and 6.

The liquid inlet opening 96 is directly over the line of rotation for the valve opening 88 in the actuator shaft 40. Thus the shaft 40 when turned properly will cause openings 87, 88 and 96 to become aligned and admit fluid through plate 72 into the glass measuring chamber 74. Simultaneously with the registry of the inlet openings a groove with a cam surface, 100, see Figure 11 will cause the vendor counter clock 93 to rotate one unit. The counter clock 93 includes a shaft 101 to which is clamped, keyed or otherwise secured an arm 102, which is levered by the cam surface 100 to actuate the counter, see Figure 5.

In this regard note that the cam surfaces 71 and 100 of shaft 40 are positioned to actuate their respective devices, namely follower 69 and lever 102 so that the glass 74 is filled and the counter clock 93 rotated to register one unit just prior to the opening of the main discharge valve 66. This arrangement makes it certain that an accurate measurement is first made and that the counter and inlet valve are reset before the actual discharge of the fluid occurs. This will be explained more fully under the following heading of operation.

Mounted over the distributor block 92 is a U-shaped head 103, best shown in Figures 5 and 9. This head 103 has a centrally positioned raised manifold section 104 formed with an annular opening 105 through the top and around the peripheral edge of which is an upstanding collar 106. Within the collar 106 and inverted over the opening is a dome-shaped sight glass 107 and leading into the opening through the manifold 104 is a fluid inlet 108. This inlet 108 connects with the liquid line 17 from the bottles 36.

The opening 105 seats directly over the pocket 94 in block 92 and is detachably secured in place by suitable means, such as bolts 109. Bolts 109 are sufficiently long to extend through openings 110 in the U-shaped head 103 into several threaded sockets 111 in the base 44. Also, the head 103 is formed with a cut-out section 112 so as to straddle the counter clock unit 93 when assembled on the block 92.

The modified arrangement of the present invention shown in Figures 2 and 4 is different from Figures 1 and 3 only in the arrangement of the bottles 36, which in this form are numbered 36a. The bottles 36' are mounted in normal upright position in tiers instead of in the inverted position of Fig. 1. With this arrangement the same liquid line 17 is positioned under the shelves 19, and the air line 15a is relatively short and formed with a goose-neck 15b, the end of which is directed through a bottle stopper 33a. The air line 16 is eliminated in this form. Then the liquid discharge tube 30a extends upward from just above the bottom of the bottle through the stopper 33a and downward through line 20a into liquid line 17. Also, for use with inwardly convex bottle bottoms, as shown in Figure 4, an added offset attachment 25b is used. This attachment extends to the lowest part of the bottle and thereby permits total dispensing of the contents. To improve the dispensing action any mechanical means may be used, such as a fluid pump or a compressed air unit, not shown. In most cases, a gravity feed like Figures 1 and 3 is satisfactory.

The remaining parts shown in Figure 2 are duplicates of Figure 1 and are accordingly given the same reference characters.

Operation

A general description of the operation with particular reference to Figures 1 and 5 should be sufficient to enable a clear understanding of the system and apparatus. For example, a drink has been ordered from unit A and the particular brand of liquid or drink in the row of bottles 36 connected thereto. All that is required for the measured dispensing of the drink ordered is to be first certain the lock bar 43 is removed to unlock the actuator shafts 40. The handle 41 of unit A is in position when locked and unlocked to register the inlet valve openings 87, 88 and 95 so that liquid from line 17 and chamber 105 under glass dome 107 is in the glass chamber 74.

The shaft 40 is turned and actuates the drink counting clock 93 one unit to count this drink which may be dispersed following the filling of the meter glass 74. The final dispensing occurs when a slight turn of shaft 40 causes the high part of cam surface 71 to force valve stem 63 downwardly against the action of the valve spring.

As the valve 66 opens the float 77 drops below vent 76 and, the contents of glass 74 empties through spout 57 into a glass 110 on the bar 45.

The spout 57, as shown in Figs. 1 and 2, may be swung to any angular position required on ball joint connection 58. Also, the handles 41 when positioned toward the customer side of the bar may be operated by the customer, to thereby provide a self-service bar.

Thus there is provided an economical, durable dispenser for measured amounts of fluid, which will count each unit quantity of fluid dispensed, so that each container may be dependably equally divided in equal quantities without loss of any part thereof. Also, each dispenser may be operated by the bar tender or the customer or any operator and still the amount dispensed is counted and known to the proprietor as he keeps the units locked when not under his supervision.

Without further description it is thought that the advantages of the present invention over the prior art will be apparent and while only two embodiments of the system and one of the dispenser unit are illustrated, it is to be expressly understood the same is not limited thereto as various changes may be made in the design and arrangement of the parts illustrated, as will now appear to others and those skilled in the art. For a definition of the scope or limits of the invention, reference should be had to the appended claims.

What is claimed is:

1. A liquor dispenser connected to a remote source of supply comprising a base, a predetermined quantity chamber detachably mounted on said base having a cover plate with a liquor inlet opening connected to said supply source, an operating shaft including an opening alignable with said inlet opening in the cover plate, a cam surface formed in the shaft offset circumferentially from the shaft inlet opening, an outlet valve at the bottom of said chamber, said cam serving to open the outlet valve when said operating shaft is turned and to disalign said inlet openings, whereby a measured quantity in the said chamber is dispensed, said operating shaft being formed with a second cam surface, a lever in the path of said cam, a counter connected to said lever for counting each measured quantity dispensing turn of the shaft required to dispense each measured quantity from said chamber.

2. In a liquor dispensing unit, a base, a glass walled chamber detachably mounted thereon, an outlet valve below the chamber, a distributor block for mounting a liquor feeding recess connected to a source of supply, an operating shaft journalled to turn in the block, said shaft including an enlarged portion with an inlet opening, a first cam formed from the shaft offset circumferentially with respect to said opening for controlling said outlet valve, a counter mounted in the block, a second cam formed from the shaft and a connected lever for operating the counter for each discharge of liquor from said chamber, and manual means for turning said shaft.

3. A predetermined quantity liquid dispenser having a liquid measuring chamber, said chamber comprising a cylinder formed with a longitudinally extending groove from its top rim to a medial point within the bore thereof, said medial point of the groove constituting a stop surface at substantially right angles to the axis of the cylinder, a top plate seated on the top rim of the said cylinder having a valve controlled inlet opening therein, and a tubing having an air inlet opening projecting slightly above said top plate, a vent opening in a side of said tube below the plate, a piston in said tube normally closing said vent responsive to the liquor in the said measuring chamber, a bottom discharge valve normally closing the bottom of said cylinder for discharging the liquor from the measuring chamber, said valve having an elongated valve stem, a cam follower carried by said valve stem, an operating shaft journalled in a block above said top plate, said shaft having a liquid inlet opening and a cam formed in the said shaft engaged with said cam follower on the valve stem, said cam being offset circumferentially of the shaft from the said liquid inlet opening, whereby a progressive cycle of filling and discharging is provided by turning the said shaft first to close the inlet opening while simultaneously said cam opens said discharge valve, said piston in said hollow air inlet tube being movable when said discharge valve is opened, to thereby open said normally closed air vent.

4. The dispenser described in claim 3, wherein said shaft is formed with a second cam for actuating a lever connected to a counter clock for each predetermined quantity of fluid supplied by said inlet valve into said chamber.

GASPARI H. CANNELLA.

REFERENCES CITED

The following references are of record in the file of this patent:

UNITED STATES PATENTS

| Number | Name | Date |
|---|---|---|
| 457,913 | Fowler | Aug. 18, 1891 |
| 463,304 | Fowler | Nov. 17, 1891 |
| 490,823 | Fowler | Jan. 31, 1893 |
| 548,534 | Foster et al. | Oct. 22, 1895 |
| 842,016 | Robinson | Jan. 22, 1907 |
| 871,253 | Bauman | Nov. 19, 1907 |
| 1,029,725 | Smith | June 18, 1912 |
| 1,525,650 | Koenig | Feb. 10, 1925 |
| 1,883,787 | Head et al. | Oct. 18, 1932 |
| 1,939,981 | Hillyard | Dec. 19, 1933 |
| 2,018,389 | Wagner | Oct. 22, 1935 |
| 2,313,954 | Mariani | Mar. 16, 1943 |